United States Patent [19]

Corrigan

[11] 3,821,762

[45] June 28, 1974

[54] PHOTOGRAPHIC EXPOSURE UNIT AND PROCESSING SYSTEM

[75] Inventor: Richard A. Corrigan, Temple City, Calif.

[73] Assignee: Bell & Howell Co., Chicago, Ill.

[22] Filed: July 23, 1973

[21] Appl. No.: 381,454

[52] U.S. Cl. .................................. 95/13, 95/89 L
[51] Int. Cl. .......................................... G03b 17/52
[58] Field of Search ............. 95/89 R, 89 L, 13, 14; 96/76 R, 76 C; 355/27, 106

[56] References Cited
UNITED STATES PATENTS

| 2,477,304 | 7/1949 | Land | 95/89 L X |
| 3,472,138 | 10/1969 | Robin et al. | 95/89 R X |
| 3,572,232 | 3/1971 | Cronig | 95/89 R |
| 3,607,284 | 9/1971 | Harvey | 96/76 C |
| 3,615,541 | 10/1971 | Hubert | 96/76 C |
| 3,640,204 | 2/1972 | Gordon | 95/89 L |
| 3,715,158 | 2/1973 | Fevre et al. | 355/27 |

Primary Examiner—Richard M. Sheer
Assistant Examiner—Alan Mathews
Attorney, Agent, or Firm—Nilsson, Robbins, Bissell, Dalgarn & Berliner

[57] ABSTRACT

A photographic processing system including a novel photographic medium packet. The packet comprises an inner pack having a photographic medium such as microfilm disposed in light-tight releasable sealing engagement between two protective layers of paper or the like, one of which has a light-transmitting window to permit exposure of the film. The pack is slideably disposed within a light-tight envelope and a portion of the pack extends from an open end of the envelope. The opposite end of the envelope has a pull tab so that the envelope can be moved to expose the window, when desired.

For processing, the packet is releasably disposed within a processing unit including a compartment out of which the tab extends. The housing includes a separate compartment containing a monoweb bearing materials for developing the film. Upon pulling the tab to expose the window, the monoweb is guided into and out of contact with the film to effect development.

A novel photographic exposure and processing unit is provided adopted for a camera or the like.

9 Claims, 6 Drawing Figures

PHOTOGRAPHIC EXPOSURE UNIT AND PROCESSING SYSTEM

FIELD OF THE INVENTION

The present invention generally relates to photographic equipment and more particularly to equipment for exposing and processing of photographic media.

BACKGROUND AND SUMMARY OF THE INVENTION

Conventional wet processing of exposed photographic media such as exposed microfilms and the like involves contacting the film first with a developer solution and then with a fixer solution in order to develop the latent image and to fix the same. Such two step procedure is relatively time consuming, and not well adopted to processing by unskilled personnel. Accordingly, newer, faster one-step procedures employing so-called monobath webs have received increasing attention. Such monobath webs carry all of those materials necessary for the developing and fixing of the photographic image which are not initially carried by the photographic film. Upon application of the monobath web to the exposed film, developing and fixing are accomplished in a single step. Such a procedure can easily be automated for rapid, economical large-scale operations.

There now is a need for equipment for the most efficient, rapid and portable use of the monobath webs. Preferably, such equipment should also be capable of being modified to include exposing and developing within a single unit.

The foregoing needs have now been satisfied by the present invention. A novel photographic processing system is provided which includes a monobath processing web and a novel packet for permitting contact of the exposed photographic medium with the web. The web and packet are disposed within a housing which may also contain photo-exposing means. The packet can also be provided in an exposure unit which includes an apertured container for the packet, the container acting as part of, or attachable to, a camera. The described system and unit can be made compact, portable and of inexpensive materials and can be automated easily and adopted to quantity exposing and developing. Other advantages are set forth in the following detailed description and accompanying drawings.

Prior art includes the following U.S. Pat. Nos.: 253,354, 471,586, 1,311,676, 1,767,972, 2,351,877, 2,447,468, 2,596,677, 2,624,253, 2,638,826, 2,689,306, 3,053,160, 3,427,159 and 3,537,370.

DRAWINGS

DETAILED DESCRIPTION

Figure 1:
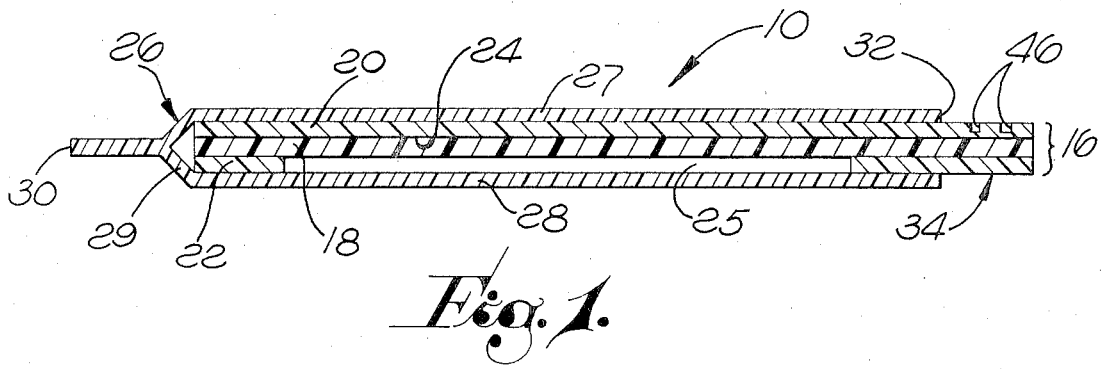
FIG. 1 is a schematic cross-section of one embodiment of the novel photographic medium packet of the present invention.
Figure 2:
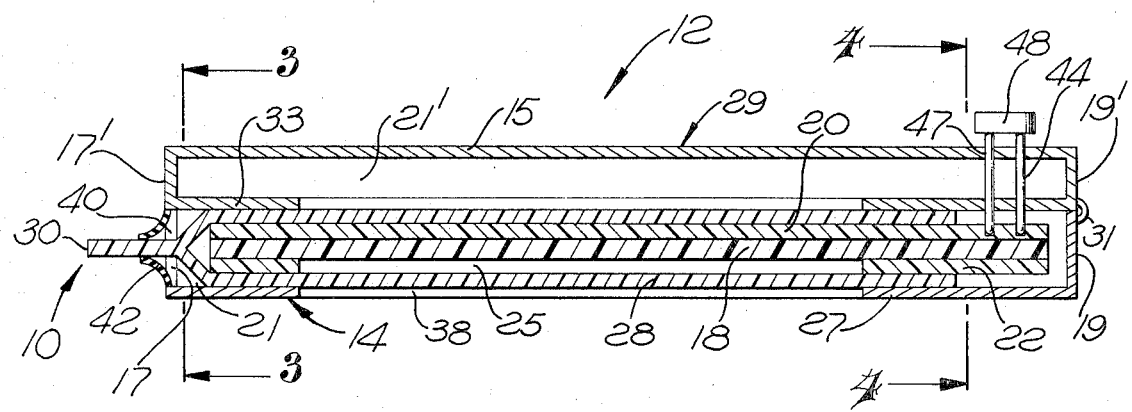
FIG. 2 is a schematic cross-section of the packet of FIG. 1 disposed in a container and forming therewith a preferred embodiment of the novel exposure unit of the present invention.

Referring to FIG. 1, an improved photographic medium packet 10 particularly adapted to be developed by a monobath processing web or the like is schematically illustrated in cross-section. The packet 10 is formed for placement in a container 14 of a photographic exposure unit 12 (FIG. 2). The packet 10 includes an inner pack 16 comprising a generally flat photographic medium 18, such as silver halide emulsion film, for example, microfilm or the like, of extended surface area and disposed between two essentially coextensive, releasably adherent backing and cover layers 20 and 22, respectively, of chemically inert material, such as paper, plastic or the like. The backing layer 20 preferably has a surface 24 thereof abutting the medium 18 treated so as to provide an anti-halo protective effect. Thus, for example, the surface 24 can be dead black in color and wholly non-reflective. The cover layer 22 defines a light-transmitting window 25 through which the medium 18 can be exposed.

The pack 16 is slideably disposed within an outer light-tight envelope 26 of paper, plastic or the like having closed top 27 and bottom 28 walls, closed sides (not shown), a closed end 29 with an outwardly-extending pull tab 30 and an open opposite end 32 through which a portion 34 of the pack 16 extends. When the envelope 26 is in the position shown in FIG. 1, the window 25 is protected from light by the bottom wall 28. However, the envelope 26 can be slid relative to the pack 16 by pulling the tab 30 so as to expose the window 25 for exposing the medium 18 to a light pattern through the window. After such light exposure, the envelope 26 can be slid back to the protective position shown in FIG. 1 until the medium 18 is to be developed. Accordingly, the packet 10 is a novel and effective form of an exposure unit for photographic purposes. Such unit has particular advantages when developed by a monobath web or the like in equipment more particularly described hereafter.

Figure 3:
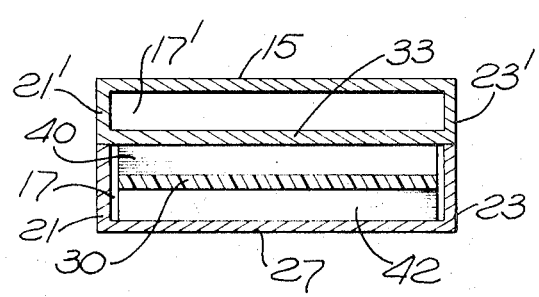
FIG. 3 is a cross-sectional view of a portion of FIG. 2 in the direction of the arrow.
Figure 4:
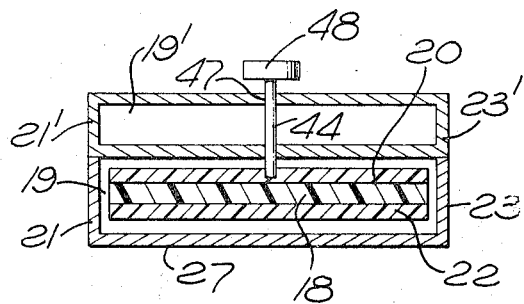
FIG. 4 is a cross-sectional view of another portion of the device of FIG. 2 in the direction of the arrows.

Referring to FIGS. 2, 3 and 4, there is schematically depicted an exposure unit 12 for containing the packet 10 releasably disposed within a hollow container 14. The container 14 includes front and rear walls 17 and 19, respectively, side walls 21 and 23, and a bottom wall 27. The bottom wall defines an aperture 38 in registry with the packet window 25. The front wall 17 defines an aperture 40 through which the packet tab 30 extends and is provided with a light-sealing gasket 42 of rubber or the like. The exposure unit 12 also includes a hollow cover 29 having front and rear walls 17' and 19', respectively, side walls 21' and 23' and a bottom, inwardly directed flange 33. The cover 29 is connected to, but pivotally separable from the container 14 by a hinge 31 connecting the rear walls 19 and 19' to enable loading the packet 10 into the container 14. The container 14 can be fabricated of any suitable material, such as plastic, metal, cardboard, wood, or the like.

In addition, packet-positioning means, such as in the form of slideable spaced pins 44 are provided for accurately positioning the packet 10 in the container 36. The pins 44 releasably engage the extended portion 34 of the pack 16 through pin apertures 46 therein (FIG. 1) via apertures 47 in the top wall 15. The pins 44 are secured to a button 48 external of the unit 12 for movement of the pins 44 between the packet-engaging position shown in FIG. 2 and a non-engaging position.

The exposure unit 12 can be used to expose the medium 18 to a light source after connection to and alignment of the container 14 with a camera or the like exposing device. Alternatively, the unit 12 can be an integral part of a camera device. In order to expose the medium 18, the tab 30 is pulled away from the container 14 until the window 25 is fully exposed through the aperture 38. When exposure is completed, the tab 30 is urged toward the container 36 until the bottom wall 28 fully covers the window 25. The packet 10 can then be removed from the container 14 and developed as more particularly described hereafter, or the unit 12 can be left intact with packet 10 therein and can be connected to and form part of a suitable photographic processing system, again as more particularly described hereinafter.

Figure 5:
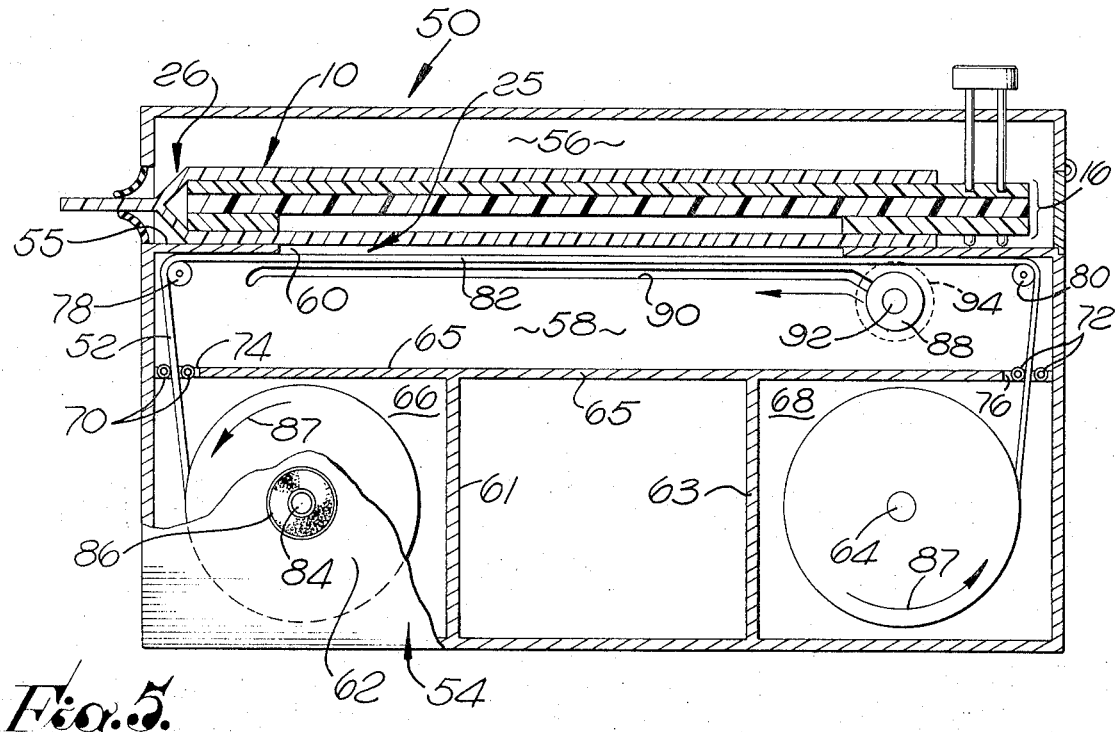
FIG. 5 is a schematic side elevation, partly broken away and partly in cross-section, of a first preferred embodiment of the improved processing system of the present invention.

Referring to FIG. 5, an improved photographic processing system 50 is schematically shown. The system 50 includes the packet 10 of FIGS. 1 and 2 and a monobath web 52 or the like processing web disposed within a hollow housing 54. The housing 54 can be fabricated of any suitable material, such as wood, metal, plastic or the like and is divided by a wall 55 into a first openable compartment 56 containing the packet 10 and a second compartment 58 communicating therewith through an aperture 60 aligned with the window 25. It will be noted that the unit 12 can form the compartment 56 and there is a correspondence of parts, i.e., the aperture 60 corresponds to the aperture 38. In such event, the unit 12 can be detachably secured to the remainder of the housing 54.

The monoweb 52 can comprise a suitable support material of extended surface area bearing developing agents for development of a latent photographic image in the medium 18. The web 52 can thus include any one or more of developer, fixer, developer activator and other conventional monoweb constituents, usually in a moistened state. It will be understood that, if desired, a portion of materials necessary for such development (and fixing) can be carried on the medium 18 as known to the art. The chemical components of such webs are well known to the photographic art and form no part of the present invention.

The processing web 52 is trained around and extends between a pair of reels 62 and 64 disposed within separate subcompartments 66 and 68, respectively, of the compartment 58 defined by vertical walls 61 and 63 and a top wall 65. The web 52 is disposed between pairs 70 and 72 of guide rollers positioned at apertures 74 and 76 in the sub-compartments 66 and 68, respectively, and around guide rollers 78 and 80 just below the compartment 56. Accordingly, a portion 82 of the web 52 overlying the rollers 78 and 80 is close to and parallel to the packet 10. The pairs of rollers 70 and 72 help moisture seal the sub-compartments 66 and 68 to retain moisture on the unused portion of the web 52.

At least one of the reels 62 and 64 is provided with drive means, for example, a drive shaft 84 extending outwardly through the housing 54 and connected to a turn knob 86 (or motor, if automatic operation is desired) or the like for rotation of the reels 62 and 64 in the direction indicated by the arrows 87. When it is desired to develop the previously light-exposed medium 18 in the packet 10, the window 25 is exposed in the manner previously described in connection with the unit 12 of FIG. 2. A fresh portion of the monoweb 52 is then reeled into place adjacent the window 25. Such fresh portion is then moved into contact with the medium 18 accessible through the window 25. This is accomplished by any suitable releasable contacting means, for example, a roller 88, moveable along a curved path defined by a slot 90 in the housing 54. The roller 88 is positioned on the side of the portion 82 of the web 52 opposite that which faces the window 25 and is dimensioned such that in its rest position (shown in FIG. 3) it is out of contact with the web 52. However, when it is moved along the curved slot 90 it urges the portion 82 of the web 52 through the window 25 and against the portion of the medium 18 exposed through that window, causing transfer of agents from the portion 82 to the medium 18 and development and fixing thereof. The roller 88 is connected to a guide shaft 92 extending outwardly through the slot 90, which shaft is secured to a knob 94 (shown in shadow) external of the housing 54. One pass of the roller 88 along the full length of its travel and return to its rest position is all that is necessary to accomplish the desired transfer.

After development and fixing is completed, the envelope 26 can be slid back over the window 25 (if desired) and the packet 10 can be removed from the housing 54. Development of another packet can then be carried out in the manner described above. The rollers, reels, drive shafts and knobs shown in FIG. 3 can be fabricated of conventional inexpensive materials, as can the remaining components of the system 50 so as to provide an economical efficient processing system.

Figure 6:
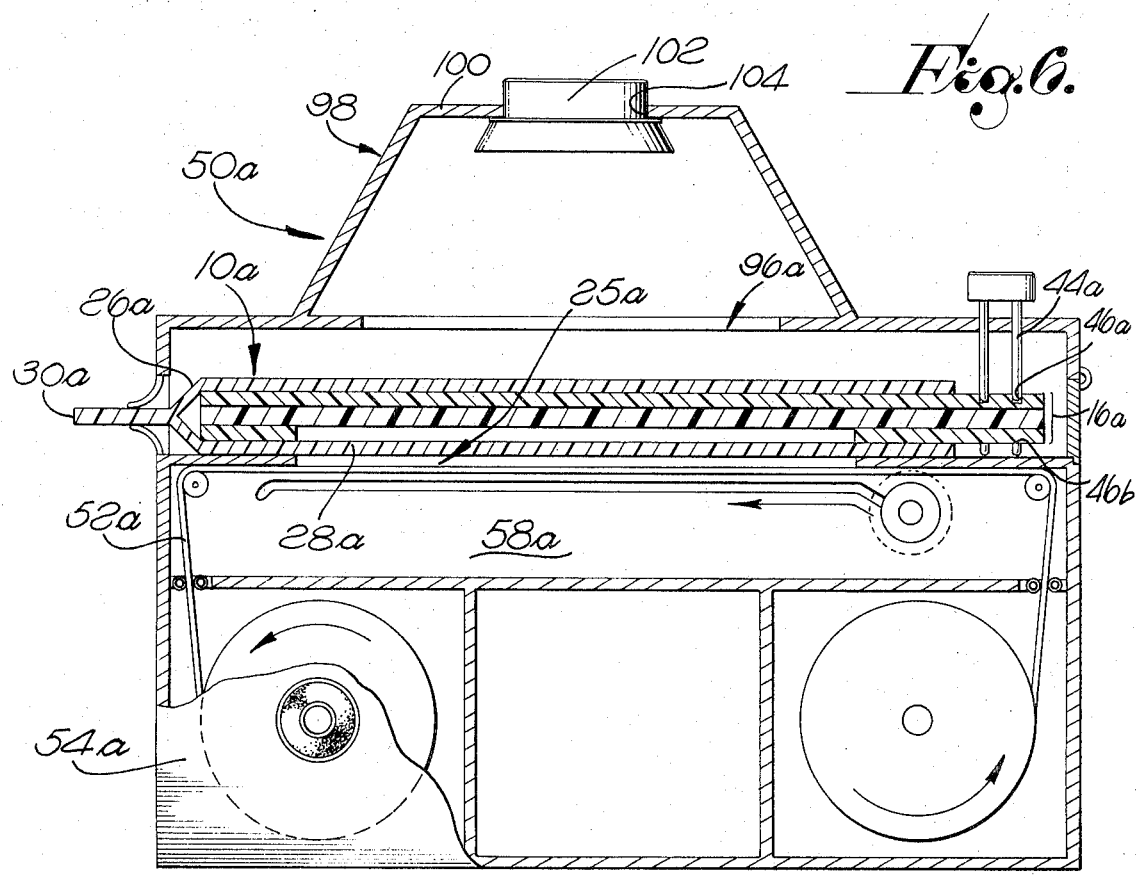
FIG. 6 is a schematic cross-section of a second preferred embodiment of the improved processing system of the present invention.

Referring to FIG. 6, a system is schematically depicted which is similar to the system 50 but also includes plate exposing means, so that photo exposure, developing and fixing can be accomplished in a single system. Substantially identical components of the system of FIG. 4 bear the same numerals as those of FIG. 3 but are succeeded by the latter "a." Thus, a system 50a is shown, which includes a packet 10a (having an inner pack 16a and an outer envelope 26a) disposed within a compartment 56a in a housing 54a. A monoweb 52a is disposed in a second compartment 58a within the housing 54a. The housing 54a defines an aperture 96 aligned with the window 25a and communicating between the compartment 56a and a photoexposing component 98 which includes a hollow container 100 and light-modulating means 102 disposed in an aperture 104 thereof. The means 102 can include a lens, diaphragm, shutter (not shown) or the like conventional camera components.

The packet 10a is shown in position for development by the web 52a after exposure to a light pattern by the component 98. To place the packet 10a in position for exposing the medium 18a to light through the means 102, the window 25a must face the means 102. In this case, the pins 44a would extend through alignment apertures 46b opposite the apertures 46a. The tab 30a is pulled to expose the window 25a and the exposure through the means 102 is then made. The tab 30a is then pushed to cause the bottom wall 28a to seal off the window 25a from light. The packet 10a is then withdrawn from the compartment 56a, inverted and reinserted in the compartment 56a for development and fixing as described in connection with FIG. 3. Thus, a simple, integrated system for photographic exposure and processing is described.

While the foregoing description has assumed exposure of the entire film contained in the packet 10, and development of the entire film, the system is readily adaptable to incremental exposure and development. In such procedure, address notations on the packet envelope can be keyed to film locations and partial exposure and development of successive portions only of the film can be accomplished by only partial withdrawal of the tab in each case.

Improvements as set forth in the foregoing description enable monobath photographic processing to be carried out in a rapid, economical manner. Such equipment includes a novel photographic medium packet, a novel photographic exposing unit, and a novel photographic processing system, which can include photoexposing means.

Various modifications, changes and alterations can be made in the described systems, units and components. All such modifications, changes and alterations as are within the scope of the appended claims form part of the present invention.

What is claimed is:

1. A photographic processing system, comprising a photographic medium packet and a processing unit enclosing said photographic packet said packet comprising: a generally flat photographic recording medium of extended surface area; a first layer of inert material releasably secured against, and generally extensive with, one side of said recording medium; a second layer of inert material releasably secured against, and generally extensive with, the opposite side of said medium and defining a light-transmitting window for exposing said medium; and an outer envelope having a closed end and an opposite open end, said envelope being disposed in sliding light-sealing engagement around a major part of said first and second layers and movable between positions of exposure and coverage of said window;

said processing unit comprising a housing, a first compartment in said housing within which said packet is releasably disposed, a second compartment having a wall defining an opening in registry with said packet window, said wall supporting said packet envelope in said position of coverage and in said position of exposure means for disposing a processing web in said second compartment and means for moving said web into and out of contact with said recording medium.

2. The processing unit of claim 1 including a tab extending from the closed end of said envelope for moving said envelope between said exposure and coverage positions.

3. The processing system of claim 1 wherein said web moving means includes a spaced pair of reels over which said web is disposed, means for rotating said reels, a slideable roller adapted to releasably press a portion of said web against said medium when said envelope is slid to a position exposing said window, and means for moving said slideable roller.

4. The improved processing system of claim 3 wherein said second compartment is divided into a plurality of essentially moisture sealed sub-compartments housing said reels.

5. The processing system of claim 1 including positioning means for said packet comprising moveable retainer pins connected to said processing unit and releasably engageable with said pack through apertures defined in said pack in a portion thereof external of said envelope.

6. The processing system of claim 1 wherein said medium comprises a silver halide emulsion film, wherein said first layer includes an anti-halo surface abutting said film and wherein said layers and said envelope are formed of paper.

7. The unit of claim 2 wherein said unit includes an openable hollow container disposed around and defining an aperture therethrough aligned with said window, a second light sealed aperture through which said tab means extends outwardly therefrom and releasable pack-positioning means.

8. The improved unit of claim 7 wherein said positioning means includes moveable retainer pins releasably engaged with said pack through apertures defined in said pack in a portion thereof external of said envelope.

9. The processing system of claim 1 including photoexposing means secured to said processing unit housing and communicating with said first compartment, said photoexposing means including a camera body defining a light-transmitting aperture, and a lens-diaphragm-shutter system disposed in said aperture, said housing defining an opening in said first compartment aligned with said camera body aperture and said packset window.

* * * * *